Patented Aug. 14, 1945

2,382,284

UNITED STATES PATENT OFFICE 2,382,284

METHOD OF PRODUCING FACTIS

Isaac Bencowitz, Newgulf, Tex., assignor to Texas Gulf Sulphur Company, Houston, Tex., a corporation of Texas No Drawing. Application July 8, 1943, Serial No. 493,926

4 Claims. (Cl. 106—249)

This invention relates to factis, and has for its objects the provision of certain improvements in the method of producing factis, and the provision, as a new article of manufacture, of an improved factis.

I have discovered that superior factis can be made by carrying out the digestion of polymerizable vegetable oil and sulphur in a reaction medium of solvent naphtha. It has heretofore been proposed to carry out the digestion of oil and sulphur in the presence of various media, such as kerosene, pyridine or xylene, but the resulting reaction products are either heterogeneous and composed of solid and liquid phases, or homogeneous fluids without any rubber-like properties. However, when the digestion of the oil and sulphur is carried out in a reaction medium of solvent naphtha, factis possessing good elasticity and a fair degree of tensile strength is obtained. The solvent naphtha not only acts as a solvent to facilitate the reaction and to control the temperature of the batch during the digestion period but it also contributes to the polymerized product. A considerable portion of naphtha remains in the final product.

I have further found that superior factis can be produced by digesting levulinic acid with a vegetable oil, sulphur and solvent naphtha. Levulinic acid has a ketonic structure

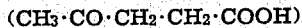

being, in fact, a ketonic acid. It is structurally different from maleic acid

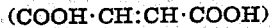

and linoleic acid ($C_{17}H_{31}COOH$), the polymerizing constituents of various oils used in the manufacture of factis, and which are unsaturated substances with a double link contributing towards the mechanism of polymerization. The levulinic acid incorporated in the factis in particular amounts improves its rubber-like qualities. I have found that the levulinic acid must be added in amounts within close limits to obtain satisfactory results and to prevent objectionable results. The principal constituents comprising vegetable oil, sulphur and solvent naphtha may have rosin incorporated therein to alter the characteristics of the factis.

Based on the foregoing discoveries, the present invention, in one aspect, involves the production of a factis by reacting or digesting, preferably with refluxing, a polymerizable vegetable oil and sulphur in a reaction medium of solvent naphtha.

In carrying out a method of the invention, the sulphur, vegetable oil and solvent naphtha are put into a digester, and levulinic acid or rosin may be added or left out as desired. The mixture is digested from four to ten hours. Digestion for longer periods does no harm. When the digestion is completed the excess solvent is distilled off. The residue can then be poured out into storage vessels. In the case of mixtures without rosin or levulinic acid, the residue is a jelly-like substance and will not pour; in the case of mixtures containing rosin, the residue is quite fluid and homogeneous when hot. In the case of mixtures containing levulinic acid, the residue is fluid but on cooling two products separate out—a rubber-like substance and a very fluid liquid. The two products can be separated by decantation.

The temperature of the digestion is controlled by the amount of solvent and also, to a minor extent, by the other constituents. The whole operation is thermostatically controlled, that is, for a given mixture, the temperature remains constant without any further care or provision. The temperature may vary, for example, from 120° C. to 150° C. depending upon the mixture.

Beyond the minimum requirements of solvent naphtha necessary to form the uniform product desired, the amount of solvent is not critical; too small an amount causes solid bodies to separate out. Excessive amounts over the amount that remains in the factis are recovered by distillation. The digestion temperature may be varied by varying the amount of naphtha; for example, a digestion temperature of 150° C. may be decreased to 130° C. by increasing the amount of solvent naphtha.

The distillation is preferably carried out to a point of incipient foaming. This is easily detected. If visual observation is impossible, the rate of distillation is plotted against the temperature. As distillation progresses the rate gradually decreases and towards the end the curve bends sharply towards the temperature axis. That is the time to stop distillation. The results of one example of such distillation are given in the following table:

Table I

| Temperature | Amount distilled |
|---|---|
| ° C. | Cc. |
| 154 | 16 |
| 157 | 23 |
| 161 | 33 |
| 173 | 45 |
| 175 | 48 |
| 177 | 50 |

The invention, in one of its method aspects, comprises digesting sulphur, vegetable oil, and solvent naphtha for the required period, usually from four to ten hours, and then distilling off the solvent until the rate of distillation begins to drop sharply.

In practicing the invention, good rubber-like products are obtained by digesting mixtures containing by weight 1 to 2 parts of sulphur, 2 to 4 parts of solvent naphtha and 4 parts of polymerizable vegetable oil. Generally speaking, the products have greater elasticity with lower ratios of sulphur to polymerizable vegetable oil. The time required to obtain the contemplated rubber-like products depends to some extent upon the digesting temperature, a shorter time being required at higher temperatures. A longer time of digestion or a higher digesting temperature, or both, may be desirable with higher ratios of sulphur to polymerizable vegetable oil.

The invention is further illustrated by the following examples in which the reaction mixtures were refluxed at temperatures of 120° C. to 150° C. for 4 to 10 hours. Then, the excess solvent naphtha was distilled off until the temperature of the liquid phase rose from 155° C. to 170° C. 75% of the solvent naphtha was recovered.

*I*

| | |
|---|---|
| Sulphur _____grams__ | 50 |
| Soy bean oil_____do____ | 100 |
| Solvent naphtha_____cc__ | 75 |

*II*

| | |
|---|---|
| Sulphur _____grams__ | 50 |
| Cottonseed oil_____do____ | 100 |
| Solvent naphtha_____cc__ | 75 |

*III*

| | |
|---|---|
| Sulphur _____grams__ | 50 |
| Levulinic acid_____do____ | 75 |
| Soy bean oil_____do____ | 25 |
| Solvent naphtha_____cc__ | 75 |

*IV*

| | |
|---|---|
| Sulphur _____grams__ | 50 |
| Levulinic acid_____do____ | 25 |
| Soy bean oil_____do____ | 75 |
| Solvent naphtha_____cc__ | 75 |

The addition of levulinic acid results in an improved product. The proportions to be used are rather specific and the range is rather small. The residue in the digester after distillation consists of a rubber-like substance and a fluid liquid which can be decanted. This fluid liquid breaks on heating at 235° C. yielding low boiling liquids and a plastic. The relative proportion of the rubber-like material and this fluid, as well as the quality of the rubber-like material, depend upon the proportions used.

When the weight of sulphur is not less than one-third the weight of soy bean oil, solid and liquid products are formed in the residue regardless of the amount of levulinic acid employed. When the weight of sulphur is less than one-third the weight of soy bean oil, only liquid products are formed in the residue. Thus, the proportion of sulphur to soy bean oil should not be less than 1 to 3 by weight. On the other hand, when the ratio of sulphur to soy bean oil is increased to 1 to 1, the residual solid product is leather-like and not of much interest as a rubber substitute or rubber-like product. Increased proportions of levulinic acid with this ratio of sulphur to oil (1 to 1) merely increases the volume of liquid phase left in the residue with the leather-like solid. The weight of the latter remains about the same. The following examples illustrate this latter point:

*Table II*

| Solvent naphtha | Sulphur | Soy bean oil | Levulinic acid | Digestion temperature | Residue after distillation | |
|---|---|---|---|---|---|---|
| | | | | | Solids | Liquid |
| Cc. | Gms. | Gms. | Gms. | °C. | Gms. | Gms. |
| 75 | 25 | 25 | 25 | 148 | 59 | 0 |
| 75 | 25 | 25 | 50 | 148 | 58 | 24 |
| 75 | 25 | 25 | 75 | 145 | 51 | 59 |
| 75 | 25 | 25 | 100 | 152 | 62 | 75 |
| 75 | 25 | 25 | 125 | 157 | 57 | 100 |

When the proportion of sulphur to soy bean oil is between 1 to 3 and 1 to 2 by weight, rubber-like residues are obtained when the ratio of sulphur to levulinic acid is not lower than 1 to 2. When the ratio of sulphur to levulinic acid is lower than 1 to 2. (e. g. when the proportion of levulinic acid is increased), asphalt-like liquids are obtained. The following examples illustrate this relationship.

*Table III*

| Example | Sulphur | Soy bean oil | Levulinic acid | Solvent naphtha | Digestion temp. | Residue after distillation |
|---|---|---|---|---|---|---|
| | Gms. | Gms. | Gms. | Cc. | °C. | |
| 1 | 25 | 50 | 25 | 75 | 148 | Fair rubber and liquid. |
| 2 | 25 | 50 | 50 | 75 | 148 | Good rubber and liquid. |
| 3 | 25 | 50 | 75 | 75 | 148 | Two liquids. |
| 4 | 25 | 50 | 100 | 75 | 150 | Do. |
| 5 | 25 | 75 | 50 | 75 | 150 | Very good rubber and liquid. |
| 6 | 25 | 75 | 75 | 75 | 148 | Homogeneous liquid. |
| 7 | 25 | 100 | 25 | 75 | 150 | Do. |
| 8 | 25 | 100 | 50 | 75 | 157 | Do. |
| 9 | 25 | 100 | 75 | 75 | 151 | Do. |

The best rubber-like substance is obtained in Examples 1, 2 and 5. Of these No. 5 gives a better yield and a somewhat superior product. In No. 5 out of a total weight of 150 gms., not counting the solvent, 123 gms. of rubber is obtained and only 15 gms. of liquid. This is equivalent to 82 per cent. In Nos. 1 and 2 the yields are 65 and 57 per cent, respectively. The volume of liquid phase is proportionately greater. In Example 5, 66 cc. of the solvent is recovered.

I have discovered that wood rosin (the principal constituent being abietic acid) may be incorporated in the factis, with due regard to the amounts of the other constituents, to alter the characteristics of the factis and even to produce other products. The critical limits of rosin with respect to other constituents of the mixture are illustrated in the following table:

Table IV

| Example | Sulphur | Soy bean oil | Rosin | Solvent naphtha | Digestion temp. | |
|---|---|---|---|---|---|---|
| | Gms. | Gms. | Gms. | Cc. | °C. | |
| 1 | 25 | 100 | 2.5 | 75 | 149 | Good rubber-like substance. |
| 2 | 25 | 100 | 5.0 | 75 | 149 | Do. |
| 3 | 50 | 100 | 5.0 | 75 | 145 | Do. |
| 4 | 50 | 100 | 10.0 | 75 | 152 | Do. |
| 5 | 50 | 50 | 5.0 | 75 | 148 | Gum-like substance. |
| 6 | 50 | 50 | 10.0 | 75 | 147 | Do. |
| 7 | 50 | 50 | 5.0 | 75 | 138 | Poor gum-like substance. |
| 8 | 50 | 50 | 10.0 | 75 | 142 | Do. |
| 9 | 50 | 200 | 25 to 50 | 75 | 149 | Homogeneous liquid. |
| 10 | 50 | 100 | 25 to 50 | 75 | 150 | Do. |
| 11 | 50 | 50 | 25 to 50 | 75 | 150 | Do. |
| 12 | 50 | Under 25 | 25 to 50 | 75 | 140 | Semi-solid plastics. |

Rubber-like substances are obtained when the weight of sulphur is not less than one-fourth the weight of soy bean oil (i. e. the ratio of sulphur to oil is at least 1 to 4), and the weight of sulphur is not less than five times the weight of rosin (i. e. the ratio of sulphur to rosin is at least 5 to 1). When the proportion of rosin is increased so that the ratio of sulphur to rosin is 2 to 1 or lower, homogeneous fluids of various viscosities are formed. The viscosities depend upon the proportion of rosin. No rubber-like bodies are formed. On the other hand, if the proportion of soy bean oil is decreased so that the ratio of sulphur to the oil is 2 to 1 or higher, solid plastics are obtained and no rubber-like bodies are formed.

Within the indicated range of proportions which result in the formation of rubber-like substances (i. e. weight of sulphur not less than one-fourth that of oil and not less than five times that of rosin), there is a distinction between the quality of the products. When the ratio of sulphur to oil is as high as 1 to 1 and the ratio of sulphur to rosin is between 5 to 1 and 10 to 1, the product is more gum-like. With lower sulphur to oil ratios, such as 1 to 2 and 1 to 4, with the sulphur to rosin ratio still between 5 to 1 and 10 to 1, good rubber-like materials are obtained.

The factis of the invention resembles natural rubber, and may be subjected to subsequent processing, compounding and the like in much the same manner as natural or synehtic rubber. It may be processed with softening agents, plasticizers, pigments and the like, and compounded with the customary rubber compounding agents. Thus, the product may be compounded with carbon black or zinc oxide, milled and formed into sheets. Any tackiness of these sheets may be removed by dipping the sheets in a 10% aqueous caustic soda solution for 5 to 10 minutes.

I claim:

1. The improvement in the production of factis which comprises reacting in solvent naphtha a mixture of 1 part levulinic acid, about 2 parts of soy bean oil and from 1 to 2 parts of sulphur by weight leaving a part of the solvent naphtha in the factis and removing the excess solvent naphtha by distillation.

2. The improvement in the production of factis which comprises reacting a mixture of 1 to 2 parts by weight of levulinic acid, 4 parts by weight of a polymerizable vegetable oil and 1 to 2 parts by weight of sulphur in solvent naphtha for several hours, and distilling off excess solvent naphtha, leaving a part of the solvent naphtha in the resulting factis.

3. The improvement in the production of factis which comprises reacting with refluxing for at least four hours at a temperature around 150° C. 1 to 2 parts by weight of levulinic acid, 1 to 2 parts by weight of sulphur and 4 parts by weight of a polymerizable vegetable oil in a reaction medium of 2 to 4 parts by weight of solvent naphtha, and distilling off excess solvent naphtha from the resulting rubber-like reaction product.

4. The improvement in the production of factis which comprises reacting with refluxing for several hours at a temperature around 150° C. a mixture of levulinic acid, a polymerizable vegetable oil and sulphur in solvent naphtha, the ratio of sulphur to vegetable oil being between 1 to 2 and 1 to 3 when the ratio of sulphur to levulinic acid is not lower than 1 to 2 by weight, and distilling off excess solvent naphtha from the resulting rubber-like reaction product.

ISAAC BENCOWITZ.